United States Patent [19]

Neely

[11] Patent Number: 5,758,006
[45] Date of Patent: May 26, 1998

[54] CHUCK FOR GRIPPING AN OPTICAL FIBER FOR LENSING

[75] Inventor: Ronald E. Neely, Aloha, Oreg.

[73] Assignee: Photonic Packaging Technologies, Inc., Beaverton, Oreg.

[21] Appl. No.: 790,468

[22] Filed: Jan. 29, 1997

[51] Int. Cl.⁶ .................................................... G02B 6/36
[52] U.S. Cl. .................................................... 385/137; 385/147
[58] Field of Search ........................ 385/134, 135, 385/136, 137, 147, 76

[56] References Cited

U.S. PATENT DOCUMENTS

| | | | |
|---|---|---|---|
| 4,091,580 | 5/1978 | Oates | 451/41 |
| 4,537,466 | 8/1985 | Moisson et al. | 385/137 |
| 4,607,496 | 8/1986 | Nagaura | 451/288 |
| 4,818,263 | 4/1989 | Mitch | 385/33 |
| 5,044,721 | 9/1991 | Nakamura | 385/137 |
| 5,261,020 | 11/1993 | De Jong et al. | 385/76 |
| 5,381,497 | 1/1995 | Toland et al. | 385/137 |
| 5,416,883 | 5/1995 | Hakoun et al. | 385/137 |
| 5,437,000 | 7/1995 | Dyott | 385/137 |
| 5,440,665 | 8/1995 | Ray et al. | 385/135 |
| 5,497,443 | 3/1996 | Jie et al. | 385/134 |
| 5,689,607 | 11/1997 | Vincent et al. | 385/136 |

*Primary Examiner*—John Ngo
*Attorney, Agent, or Firm*—Smith-Hill and Bedell

[57] ABSTRACT

A chuck assembly for gripping and rotating an optical fiber has a chuck body including a bearing and a journal fitted rotatably in the bearing and defining a bore for receiving the optical fiber with a clearance fit. Water is supplied to the clearance between the optical fiber and the journal and is frozen in situ, thereby securing the optical fiber against movement relative to the journal.

21 Claims, 5 Drawing Sheets

CHUCK FOR GRIPPING AN OPTICAL FIBER FOR LENSING

REFERENCE TO GOVERNMENT CONTRACT

This invention was made in the course of work under Contract F-33615-93-C-4321 with the United States Department of the Air Force. The United States government has certain rights in the invention.

BACKGROUND OF THE INVENTION

This invention relates to a chuck for gripping an optical fiber for lensing.

Optical fibers are commercially available in several configurations. One conventional optical fiber configuration comprises a core, a cladding, a layer of metallization, and a protective buffer layer of synthetic polymer material.

It is known to grind a conical microlens on an end of an optical fiber by positioning an end segment of the fiber at an acute angle relative to an abrasive lap and with the end of the fiber in contact with the lap, and rotating the end segment of the fiber about its central axis while translating the lap past the end of the fiber.

It is desirable that it should be possible to adjust the contact force between the fiber tip, since the optimum contact force for one grinding operation might not be optimum for another grinding operation. However, in order to form an accurate conical microlens on the end of the optical fiber, it is necessary that the contact force remain constant during a given grinding operation.

It is also desirable that the grinding operation should not have any other effect on the fiber or its cladding. In particular, the optical fiber structure should not be degraded in any fashion during the grinding operation.

U.S. Pat. No. 4,818,263 discloses an apparatus for forming a conical microlens on an end of an optical fiber. In accordance with the teaching of U.S. Pat. No. 4,818,263, one end of a length segment of the fiber is clamped in a collet that is attached to the output shaft of a fiber drive motor and the other end of the length segment of fiber is fed with a loose fit into a guide tube that is inclined to vertical so that the free end of the fiber projects from the guide tube into contact with an abrasive lap on a horizontal turntable that rotates about a vertical axis. The fiber drive motor is positioned so that there is a bend in the fiber between the guide tube and the collet. Because of the bend, the fiber exerts a reaction force pressing the free end of the fiber against the lap. The fiber drive motor rotates the collet and consequently the length segment of fiber rotates in the guide tube. Water is supplied to the guide tube and serves as a bearing between the fiber and the interior of the guide tube. The water also flushes away abrasive particles and cleans the lap and cools the fiber. As the fiber rotates, e.g. at a speed of 100 rpm, and the turntable rotates, e.g. at a speed of 500 to 1,000 rpm, the lap grinds a conical surface on the free end of the fiber.

The arrangement described in U.S. Pat. No. 4,818,263 is subject to disadvantage in that the force with which the free end of the fiber is pressed against the lap does not remain constant. Thus, the force depends principally on the length of bent fiber between the guide tube and the collet and this length will diminish as the fiber is ground. Furthermore, any variation in the height of the lap surface relative to the end of the guide tube as the turntable rotates will cause a variation in the length of fiber between the guide tube and the collet and hence in the contact force. A further disadvantage is that the force between the free end of the fiber segment and the lap is not adjustable to a significant extent.

In the apparatus shown in U.S. Pat. No. 4,818,263, the frictional engagement of the lap with the free end of the fiber forces the fiber into contact with the interior surface of the guide tube, and as the fiber rotates in contact with the guide tube the metallization on the fiber is burnished. If there are any defects in the metallization, this burnishing may reduce the quality of the metallization. Also, in the event that hard debris from the grinding operation is not effectively removed from the grinding site by the water supplied to the guide tube, the debris may enter the guide tube and damage the fiber, for example by scoring the metallization and nicking the underlying glass cladding.

SUMMARY OF THE INVENTION

In accordance with a first aspect of the invention there is provided a chuck assembly for gripping and rotating a slender, elongated member, comprising a chuck body including a bearing defining a passage therethrough, a journal fitted in the passage in a manner allowing rotation of the journal about an axis of the passage, the journal defining a bore for receiving the slender, elongated member with a clearance fit, a water supply means for supplying water to the clearance between the slender, elongated member and the journal, and a refrigerating means in heat exchange relationship with the water in said clearance, for freezing the water and thereby securing the slender, elongated member against movement relative to the journal.

In accordance with a second aspect of the invention there is provided a chuck assembly for gripping and rotating a slender, elongated member, comprising a chuck body defining a passage therethrough, a journal fitted in the passage in a manner allowing both rotation of the journal about an axis of the chuck and linear movement of the journal along the axis of the chuck body, the journal comprising an outer sleeve and an inner guide tube fitted in the outer sleeve for receiving the slender, elongated member with a clearance fit, the guide tube being held against movement relative to the outer sleeve, a first fluid supply means for supplying water to the clearance between the slender, elongated member and the guide tube, and a second fluid supply means for passing a refrigerated fluid in thermally conductive relationship with the water in said clearance, for freezing the water and thereby securing the slender, elongated member against movement relative to the guide tube.

In accordance with a third aspect of the invention there is provided apparatus for transmitting rotational drive to a shaft that is journalled for rotation about a central axis thereof, said apparatus comprising a rotor member journalled for rotation about said central axis, said rotor member being formed with at least one radial slot defined between first and second opposite walls and with first and second passages debauching into the slot at the first and second walls respectively, a paddle member mounted on the shaft and extending with clearance into said radial slot, whereby first and second gaps exist between the paddle member and said first and second walls respectively, and a means for supplying gas under pressure to said first and second passages and for venting gas from said gaps.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
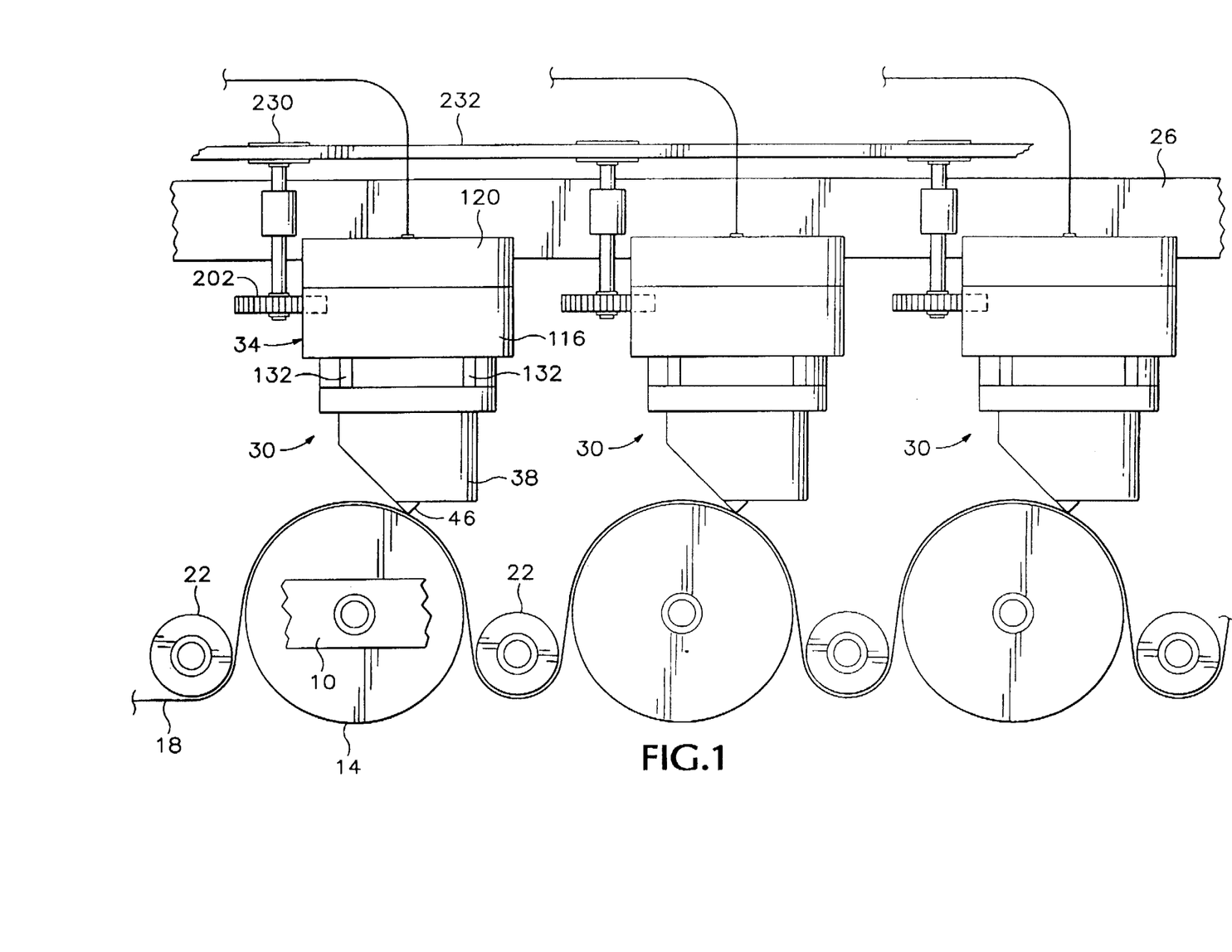
FIG. 1 is a partial general view illustrating apparatus for grinding an end face of an optical fiber.

The apparatus that is shown in FIG. 1 comprises a support frame having a horizontal lower bar 10 in which multiple grinding film support rolls 14 (only three of which are shown in FIG. 1) are mounted for rotation about respective horizontal axes. A tape 18 of lapping film passes at constant linear speed from a supply roll (not shown) to a take-up roll (not shown) and is guided over the support rolls 14 by guide rolls 22.

Above the lower bar 10 is a horizontal upper bar 26 to which multiple chuck assemblies 30, one for each support roll 14, are attached. The several chuck assemblies 30 are mounted to the upper bar 26 in a manner that effects spacing of the chuck assemblies transversely of the lap.

The structure of one of the chuck assemblies is shown in greater detail in FIGS. 2–5.

Figure 2:
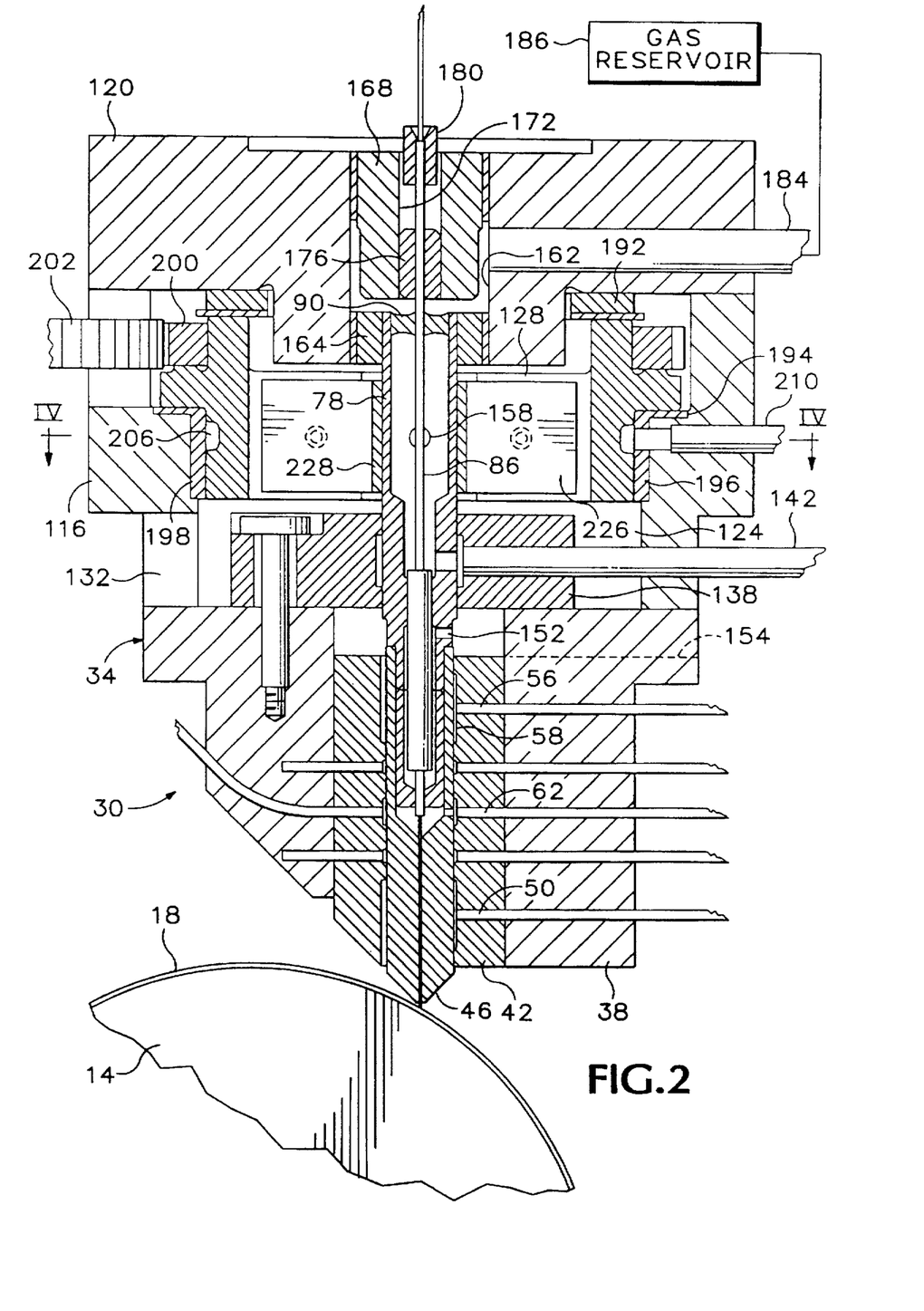
FIG. 2 is a sectional view of a chuck assembly in accordance with the present invention.
Figure 5:
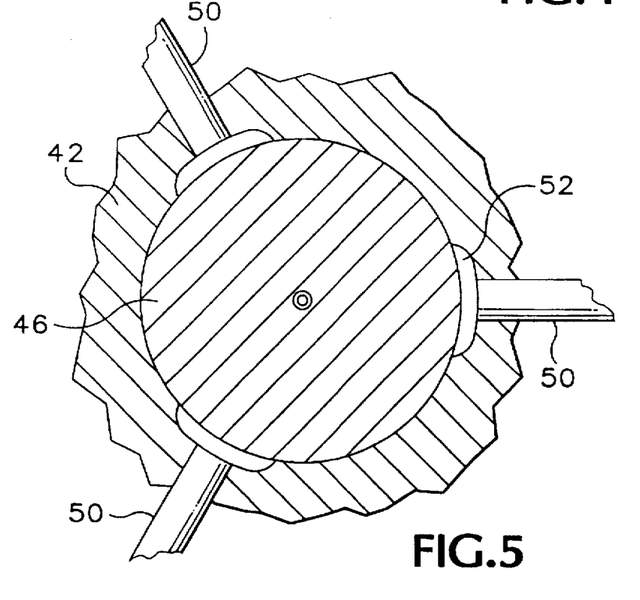
FIG. 5 is a sectional view taken on the line V—V of FIG. 3.

Referring to FIG. 2, each chuck assembly 30 includes a chuck body 34 that is mounted stationarily relative to the upper bar 26. The chuck body 34 has a lower portion 38 that defines a cylindrical cavity, the cavity having a vertical axis and containing a low friction bearing 42 in which a journal 46 is fitted. The low friction bearing is a hydrostatic bearing which is generally annular in cross-section and is formed with five sets of radial bores at axially spaced locations. Referring to FIG. 5, the three bores 50 of the bottom set are equiangularly distributed about the central axis of the bearing, and each bore of the bottom set debouches into a pocket 52 having a peripheral extent of about 30° about the central axis of the bearing. The three bores 56 of the top set are similarly arranged and debouch into respective pockets 58, only one bore and one pocket being shown in FIGS. 2 and 3. Water is supplied under pressure to the six bores 50 and 56 through corresponding passages in the chuck body 34, and the water in the pockets 52 and 58 forms respective cushions supporting the journal 46 in spaced relationship with the interior surface of the bearing 42. The bores 50 and 56 are sized in length and diameter to incur a pressure drop approximately equal to that within the bearing gap. Such a hydrostatic bearing is characterized by high radial stiffness and low friction with respect to both axial movement and rotation.

Between the upper and lower sets of radial bores 50 and 56 are three pairs of diametrically opposed bores. The two bores 62 of the center set are connected to a water supply and debouch into an annulus 64 surrounding the journal 46. The two bores 68 that are axially between the bores 50 and 62 and the two bores 72 that are axially between the bores 56 and 62 drain respective annuli 70 and 74 to ambient pressure.

Figure 3:
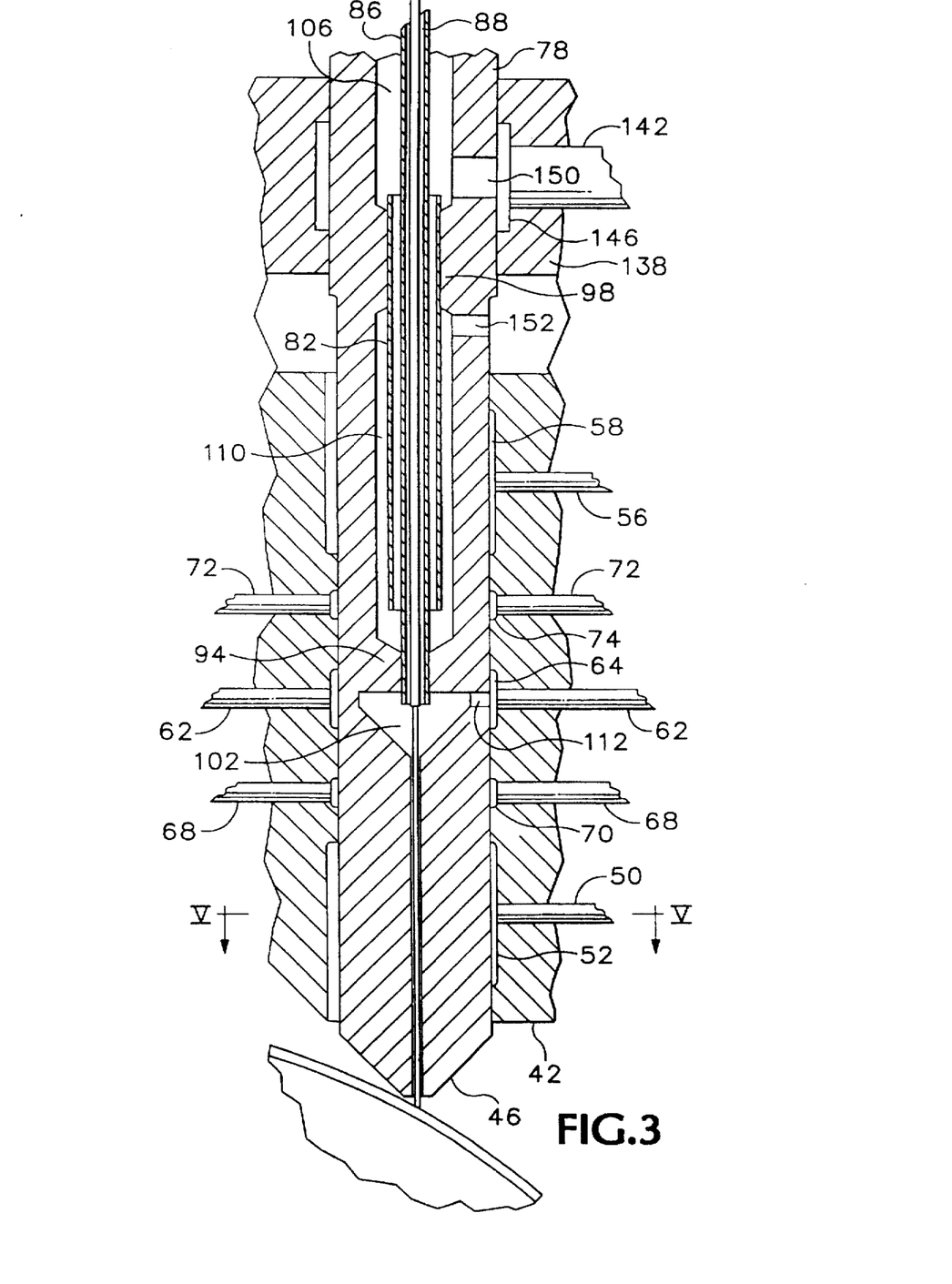
FIG. 3 is an enlarged view of a detail of FIG. 2.

Referring to FIG. 3, the journal 46 is a composite structure of which the main components are an outer sleeve 78, an intermediate heat exchange tube 82 made of stainless steel and an inner fiber guide tube 86, also made of stainless steel.

The bore 88 in the fiber guide tube is large enough to receive a specific type of optical fiber with its buffer in place. For example, in the event that the fiber is a single mode fiber having a buffer diameter of 170 μm, the bore in the stainless steel tube might be 178 μm in diameter. Thus, there is a narrow clearance of about 4 μm between the buffer and the interior surface of the fiber guide tube. It will be understood that the bore in the specific fiber guide tube might not be large enough to receive other optical fibers, such as a fiber having a buffer diameter of about 255 μm; and that a guide tube having a bore suitable for receiving a fiber having a buffer diameter of 255 μm might not be suitable for use with a fiber having a buffer diameter of 170 μm.

As shown in FIG. 3, the outer sleeve 78 defines an axial passage extending therethrough. The passage is not of uniform diameter over its length, as will be described below. The fiber guide tube 86 is supported inside the outer sleeve 78 by a seal 90 (FIG. 2) at the upper end of the outer sleeve and by a seal 94 (FIG. 3) near the lower end of the outer sleeve. The heat exchange tube 82 is supported by an internal land 98 intermediate the seals 90 and 94 and extends with a tight fit through the aperture defined by the land 98. The seals 90 and 94 and the land 98 divide the wider diameter portion of the axial passage through the outer sleeve 78 into a water chamber 102, a coolant gas inlet chamber 106 and a coolant gas outlet chamber 110. The fiber guide tube 86 terminates at its lower end in the water chamber 102. A radial bore 112 passes through the outer sleeve and provides communication between the annulus 64 and the water chamber 102. The coolant inlet and outlet chambers are in open communication through the space between the fiber guide tube 86 and the heat exchange tube 82.

Referring to FIG. 2, an intermediate portion 116 of the chuck body is attached to the lower portion 38, and an upper portion 120 is attached to the intermediate portion 116. The three portions 38, 116 and 120 define a chamber 124 which three portions 38, 116 and 120 define a chamber 124 which accommodates a torsional thrust air bearing 128. The chamber 124 is vented to the atmosphere through slots 132 in the intermediate portion 116.

Referring to both FIG. 2 and FIG. 3, a sealing block 138 is located in the chamber 124 and is attached to the lower portion 38 of the chuck body. The journal 46 extends with a narrow clearance through the sealing block, which is formed with a radial bore 142 that debouches into an annulus 146 around the journal. The sleeve 78 is formed with a radial bore 150 at the level of the annulus 146. Gas supplied to the annulus 146 through the radial bore 142 enters the coolant inlet chamber 106 in the sleeve 78. The gas passes downward into the coolant outlet chamber 110 through the clearance between the fiber guide tube and the heat exchange tube, and passes upward outside the heat exchange tube to a radial bore 152 from which it can pass through slots 154 in the lower body portion 38 into the chamber 124 and to atmosphere. The gas can also pass upward in the coolant inlet chamber 106 and escape into the chamber 124 through bores 158.

The upper portion 120 of the chuck body 34 defines a cylindrical chamber 162 that is aligned with the cylindrical chamber in the lower portion 38 of the chuck body. The upper end of the outer sleeve 78 projects into the chamber 162 through a graphite seal 164 which is held in position by epoxy adhesive. The graphite seal 164 maintains an effective clearance seal between the sleeve 78 and the upper body portion 120 while allowing the sleeve 78 to rotate and move axially relative to the upper body portion. Above the seal 164 is a plug 168 that is held in the chamber 162 with epoxy adhesive and defines an inner bore 172. The fiber guide tube extends into the inner bore 172 through a graphite seal 176 that is held in the bore 172 using epoxy adhesive. The graphite seal 176 maintains an effective clearance seal between the guide tube 86 and the plug 168 while allowing the guide tube to rotate and move axially relative to the plug. The upper end of the fiber guide tube is provided with a ceramic sleeve 180 having a conically tapering opening for guiding insertion of a fiber into the guide tube.

A radial bore 184 opens into the cylindrical chamber 162 and is connected to a gas reservoir 186. The gas reservoir can supply a controlled pressure greater or less than ambient to the radial bore 184. When the reservoir 186 supplies ambient pressure, the force driving the journal downward is the weight of the journal. The journal can be lifted to the upper end of its range of travel by reducing the pressure in the reservoir 186 to a suitable subambient value. By adjusting the pressure of the reservoir to a subambient neutral value, the weight of the journal can be balanced and the journal then floats in the chuck body. If the pressure is then increased from the neutral value, the journal exerts a downward force that depends on the difference between the actual pressure and the neutral value.

Figure 4:
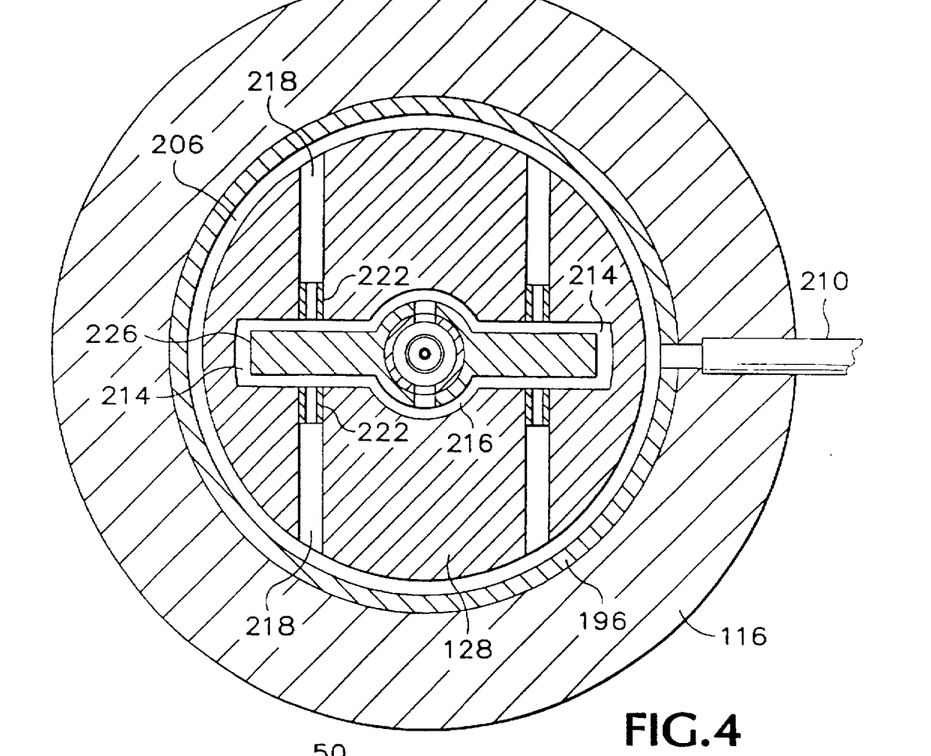
FIG. 4 is a sectional view taken on the line IV—IV of FIG. 2.

Referring to FIGS. 2 and 4, the torsional thrust air bearing 128 is generally cylindrical and is held between a non-sealing upper axial thrust bearing 192 and a low friction bearing element 198 having a radial flange 194 and a cylindrical wall 196. The radial flange 194 provides a lower axial thrust bearing. The bearing 128 is journalled in the cylindrical wall 196. The bearing 128 is thus able to rotate in the chamber 124 and is held against axial movement by the thrust bearing 192 and the flange 194. The axis of rotation of the bearing 128 coincides with the axis of rotation of the journal 46.

The bearing 128 is formed with an annulus 206 into which a bore 210 in the intermediate housing part 116 debouches for supplying air or other fluid, e.g. water, under pressure to the annulus 206. The cylindrical wall 196 seals the annulus 206.

Two radial slots 214 extend from a cylindrical bore 216 in the bearing 128, and the annulus 206 communicates with the slots 214 by way of passages 218 which debouch at opposite respective sides of each slot through respective throttles 222 of equal diameter and length. The paths from the source of air under pressure to the throttles 222 are wide, and the flow rate through the throttles is low, and accordingly the passages 218 are all at the same pressure. A paddle 226 has a hub 228 by which the paddle is mounted on the sleeve 78 and from which two blades extend into the two slots 214 respectively.

The outlet of each throttle 222 communicates with the spaces above and below the bearing 128 by way of a gap between the wall of the slot and the confronting face of the paddle blade. The space below the bearing 128 vents to atmosphere through the slots 132. An annular passage between the hub 228 and the central bore of the bearing 128 provides pressure eqalization between the space above the bearing 128 and the space below the bearing 128. Thus, the space above the bearing 128 is also at atmospheric pressure.

The flow resistance of each path between the annulus 206 and the vented spaces in the chamber 124 is composed principally of the flow resistance of the throttle 222 and the flow resistance from the outlet of the throttle to the space above or below the bearing 128 through the gap between the paddle and the wall of the slot 214. The flow resistance through the gap varies inversely with the cube of the average width of the gap perpendicular to the face of the paddle. The minimum size of the gap is such that the maximum pressure drop due to flow through the gap is not substantially smaller than the pressure drop through the throttle, so that the flow resistance of the throttle does not dominate the flow resistance of the gap. It will therefore be understood that if the two blades of the paddle are centered in their respective slots, the gap between each side of the blade and the wall of the slot will be equal and the force acting on each side of the paddle will be equal, whereas if there is relative angular movement between the bearing and the journal, the gap on one side of the paddle blade will become larger and the gap on the other side of the blade will become smaller but the imbalance in the flow resistances of the respective gaps will force the blade back to the center of the slot so that the two gaps remain equal in size. Therefore, when the bearing 128 is driven to rotate, and the gap that is ahead of a blade of the paddle tends to become wider and the gap that is behind the blade tends to become narrower, the blade is forced back to the center of its slot so that the two gaps remain equal in size and the paddle, and hence the journal, rotates with the bearing.

The bearing 128 is provided with a spur gear 200 which meshes with a drive pinion 202. Referring to FIG. 1, the drive pinion 202 is coupled through a pulley 230 and a drive belt 232 to a fiber drive motor (not shown). The torsional thrust air bearing 128 transmits rotational drive from the drive pinion 202 to the journal 46 without direct contact with the journal and in a manner that allows limited axial displacement of the journal.

In use of the apparatus shown in FIGS. 1–5, an end segment of optical fiber is unwound from a coil wound on a spool and is stripped to remove a short length of the buffer from the free end of the fiber, and the free end is inserted into the fiber guide tube 86 by way of the ceramic sleeve 180 until the end of the fiber projects from the lower end of the journal 46. The lower end of the passage in the journal 46, below the water chamber 102, passes the stripped end of the optical fiber with a narrow clearance of about 3 µm. The pressure supplied by the reservoir 186 is initially adjusted to less than the neutral value to lift the journal 46 so that there is no contact force between the end of the fiber and the lap. Water is supplied under pressure to the annulus 64 and passes through the radial bore 112 and into the water chamber 102 and is forced upward into the clearance between the fiber and the fiber guide tube. Cold gas (such as nitrogen at 228K) is supplied to the coolant inlet chamber 106 by way of the bores 142 and 150 and passes from the coolant inlet chamber to the coolant outlet chamber and leaves the journal by way of the bore 152. The water in the clearance between the fiber and the fiber guide tube is frozen and locks the fiber against radial and axial movement relative to the journal. In this manner, the fiber is gripped in the chuck assembly 30. The pressure supplied by the reservoir 186 is then increased to bring the end of the fiber into contact with the lap with a desired contact force. Water under pressure is supplied to the hydrostatic bearing through the bores 50 and 56, air under pressure is supplied to the torsional thrust air bearing 128, the drive pinion 202 is driven and the lap also is driven. Through the action of the lap against the end of the fiber, a conical microlens is ground at the end of the fiber. As grinding proceeds, and material is removed from the end of the fiber, the pressure supplied by the reservoir 186 is maintained constant or is slowly varied as the fiber rotates and accordingly the contact force remains essentially constant over each revolution of the fiber. The grinding pressure can be ramped up and down over time intervals that are long compared to the period of rotation of the fiber, by controlling the pressure supplied by the reservoir, thereby optimizing grinding pressure relative to the degree of completion of the lens.

The ice formed inside the guide tube prevents continued flow of water from the chamber 102 through the guide tube and the pressure of water in the chamber 102 forces water from the chamber 102 through the clearance between the stripped end of the fiber and the interior surface of the narrow part of the passage in the outer sleeve. This water flushes away debris and cools the lap and the end of the fiber.

The bores 68 and 72 drain to atmospheric pressure and consequently the annulus 64 is hydraulically isolated from the pockets 52 and 58 of the hydraulic bearing.

Gas escapes from the coolant inlet chamber not only by way of the coolant outlet chamber but also by way of the bores 158, cooling the fiber guide tube 86 within the torsional thrust bearing 128.

As grinding proceeds, and material is removed from the end of the fiber, the journal 46 moves axially downward. The axial extent of the annulus 64 is sufficient to ensure that the bore 112 remains in communication with the annulus 64 over the range of axial movement of the journal.

When grinding has been completed, the supply of cold gas to the bore 142 is reduced. Ice locking the fiber in the fiber guide tube rapidly melts, releasing the fiber.

Because of the characteristics of the hydrostatic bearing, there is very little friction resisting axial movement of the journal. Similarly, the torsional thrust air bearing allows rotational force to be transmitted to the journal without any direct contact with the journal, such as might create a frictional force resisting axial movement of the journal. Accordingly, the contact force of the end face of the fiber is dependent substantially only on the weight of the journal and the gas pressure in the upper chamber 162.

Figure 6:
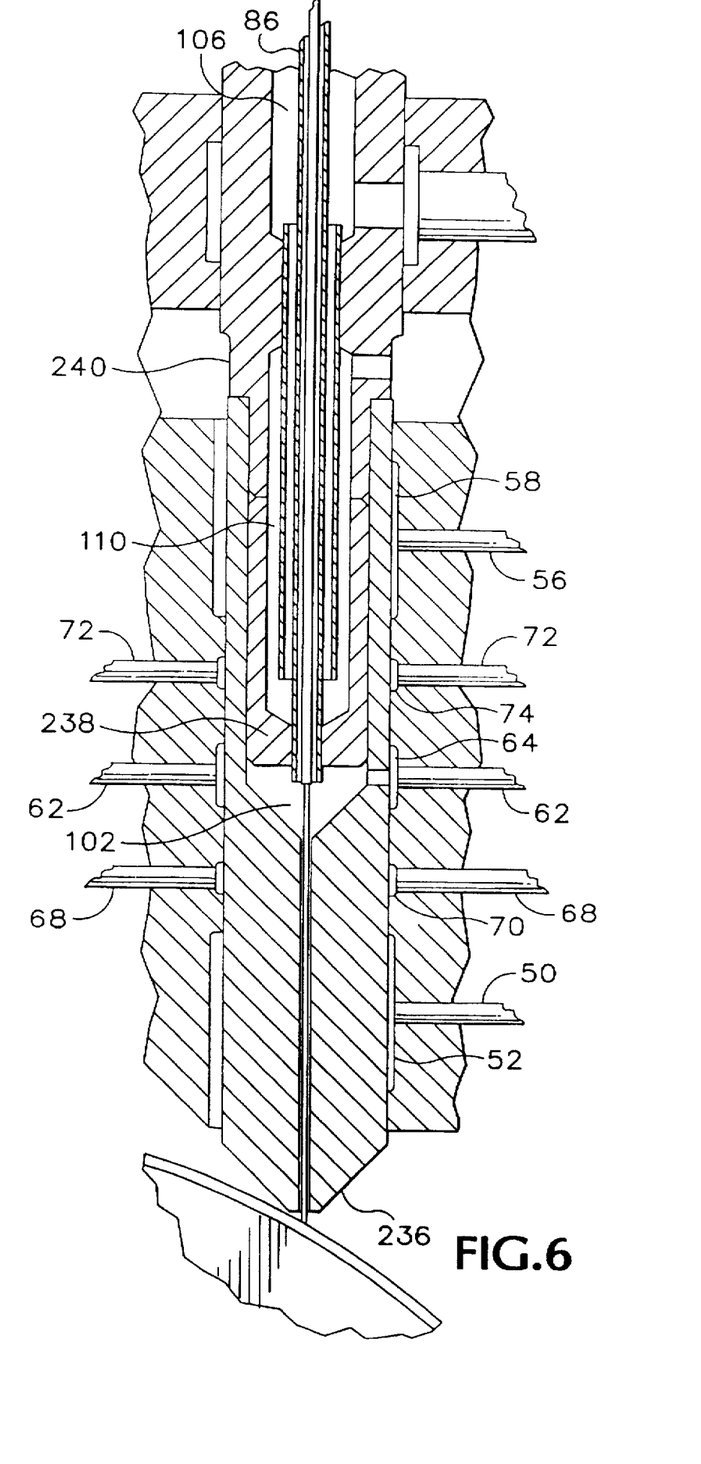
FIG. 6 is similar to FIG. 3 and illustrates the preferred construction of the component shown in FIG. 3.

Referring to FIG. 6, the outer sleeve 78 of the journal 46 is itself a composite structure. The lower portion of the outer sleeve is a ceramic ferrule 236 which extends through the hydrostatic bearing. The ferrule 236 is made of ceramic material because of its favorable mechanical properties, including wear resistance. The lower seal 94 is implemented with a tube 238 of glass-filled polycarbonate fitted inside the ferrule. The upper portion of the outer sleeve is formed by a tube 240 of graphite-filled polycarbonate whose lower end is fitted in the upper end of the ferrule. The intermediate land 98 is formed in the tube 240, and the two tubes 238 and 240 together bound the coolant outlet chamber 110. The thermal conductivity of polycarbonate is substantially lower than that of the ceramic material selected for the ferrule 236, and accordingly the polycarbonate serves as an effective thermal insulator with respect to the cold gas in the coolant outlet chamber 110 and prevents the water in the pockets 58 from freezing.

Depending on the location of the spool on which the coil of optical fiber is wound, there is a possibility that a bend in the fiber between the ceramic sleeve 180 and the fiber spool will contribute to the force acting on the journal. However, since the bend is not required in order to provide contact force with the lap, the spool may be positioned to keep this contribution to a minimum. Further, to the extent that the contribution to the contact force of a bend in the fiber cannot be eliminated by selecting the position of the spool, it can be offset by adjusting the neutral pressure of the reservoir 186.

It will be appreciated that the invention is not restricted to the particular embodiment that has been described, and that variations may be made therein without departing from the scope of the invention as defined in the appended claims and equivalents thereof.

I claim:

1. A chuck assembly for gripping and rotating a slender, elongated member, comprising:
    a chuck body including a bearing defining a passage therethrough,
    a journal fitted in the passage in a manner allowing rotation of the journal about an axis of the passage, the journal defining a bore for receiving the slender, elongated member with a clearance fit,
    a water supply means for supplying water to the clearance between the slender, elongated member and the journal, and
    a refrigerating means in heat exchange relationship with the water in said clearance, for freezing the water and thereby securing the slender, elongated member against movement relative to the journal.

2. A chuck assembly according to claim 1, wherein the journal comprises an outer sleeve and a guide tube extending therewithin and defining the bore for receiving the slender, elongated member.

3. A chuck assembly according to claim 2, wherein the journal further comprises a heat exchange tube extending within the outer sleeve and the guide tube extends within the heat exchange tube.

4. A chuck assembly according to claim 2, wherein the inner tube extends within the outer sleeve in spaced relationship therewith and the water supply means comprises a means for introducing water into the space between the outer sleeve and the guide tube and constraining water to flow into the clearance by way of an end of the guide tube.

5. A chuck assembly according to claim 2, wherein the guide tube extends within the outer sleeve in spaced relationship therewith, the water supply means comprises means for introducing water into the space between the outer sleeve and the guide tube, and the journal comprises a seal constraining water to pass into the guide tube.

6. A chuck assembly according to claim 5, wherein the outer sleeve defines a longitudinal interior space having a larger diameter portion and a smaller diameter portion and the guide tube extends within and terminates in said larger diameter portion, and the seal is located in the larger diameter portion of the interior space and defines an aperture through which the guide tube extends in sealing relationship.

7. A chuck assembly according to claim 5, wherein the seal divides said larger diameter portion of the interior space into a water chamber and a coolant chamber, the guide tube is thermally conductive and terminates in the water chamber, and the refrigerating means comprises coolant circulating means for passing a fluid coolant through the coolant chamber.

8. A chuck assembly according to claim 7, wherein the water supply means comprises means for introducing water into the water chamber.

9. A chuck assembly according to claim 2, wherein the guide tube extends within the outer sleeve in spaced relationship therewith and the refrigerating means comprises a gas supply means for supplying a refrigerated gas into the space between the guide tube and the outer sleeve.

10. A chuck assembly according to claim 2, wherein the journal defines an axial passage having a narrow part for receiving the slender, elongated member with a close fit and a wider part in which the guide tube ends, and the water supply means comprises a bore that feeds water to the wider part of the axial passage in the journal.

11. A chuck assembly according to claim 1, wherein the journal comprises an outer sleeve, a heat exchange tube extending coaxially within the outer sleeve in spaced relationship therewith, a first seal between the outer sleeve and the heat exchange tube, a guide tube extending within the heat exchange tube in spaced relationship therewith and defining the bore for receiving the slender, elongated member, and a second seal between the outer sleeve and the guide tube.

12. A chuck assembly according to claim 11, wherein the outer sleeve defines a passage having a larger diameter portion and a smaller diameter portion, the first seal bounds a coolant chamber at one end thereof, the second seal bounds the coolant chamber at an opposite end thereof and separates the coolant chamber from a water chamber, the heat exchange tube terminates within the coolant chamber, and the guide tube terminates within the water chamber.

13. A chuck assembly according to claim 12, wherein the guide tube is thermally conductive and the refrigerating means comprises a coolant circulating means for passing a fluid coolant through the coolant chamber.

14. A chuck assembly according to claim 12, wherein the water supply means comprises means for introducing water into the water chamber.

15. A chuck assembly according to claim 1, wherein the journal comprises an outer sleeve, a heat exchange tube extending coaxially within the outer sleeve in spaced relationship therewith, a first seal between the outer sleeve and the heat exchange tube, a guide tube extending within the heat exchange tube in spaced relationship therewith and defining the bore for receiving the slender, elongated member, a second seal between the outer sleeve and the guide tube at one end of the outer sleeve, and a third seal between the outer sleeve and the guide tube and spaced from the second seal, and wherein the first seal divides a coolant inlet chamber from a coolant outlet chamber through which the guide tube extends, the heat exchange tube terminates at one end in the coolant inlet chamber and at an opposite end in the coolant outlet chamber, and the outer sleeve is formed with a first bore that opens from the coolant outlet chamber and a second bore that opens into the coolant inlet chamber, whereby gas supplied to the coolant inlet chamber by way of the second bore can be discharged by way of the first bore.

16. A chuck assembly according to claim 1, comprising a hydrostatic bearing supporting the journal in the passage for rotation therein, and wherein the chuck body is formed with at least one bore for supplying water to the hydrostatic bearing and a bore for draining water from the hydrostatic bearing.

17. A chuck assembly according to claim 1, wherein the journal has an end face and the chuck body has an upper part defining a chamber in which the end face of the journal is exposed, and the chuck assembly further comprises a fluid supply means for establishing a selected pressure in said chamber for urging the journal along the axis of the passage.

18. A chuck assembly according to claim 1, wherein the chuck body defines a chamber into which the journal extends, and the chuck assembly comprises a rotor member fitted in the chamber in drive transmitting relationship with the journal, and a means for transmitting rotational drive to the rotor.

19. A chuck assembly according to claim 18, wherein the means for transmitting drive from the rotor to the journal comprises a torsional hydrostatic thrust air bearing.

20. A chuck assembly for gripping and rotating a slender, elongated member, comprising:

a chuck body defining a passage therethrough, a journal fitted in the passage in a manner allowing both rotation of the journal about an axis of the chuck and linear movement of the journal along the axis of the chuck body, the journal comprising an outer sleeve and an inner guide tube fitted in the outer sleeve for receiving the slender, elongated member with a clearance fit, the guide tube being held against movement relative to the outer sleeve, a first fluid supply means for supplying water to the clearance between the slender, elongated member and the guide tube, and a second fluid supply means for passing a refrigerated fluid in thermally conductive relationship with the water in said clearance, for freezing the water and thereby securing the slender, elongated member against movement relative to the guide tube.

21. Apparatus for transmitting rotational drive to a shaft that is journalled for rotation about a central axis thereof, said apparatus comprising:

a rotor member journalled for rotation about said central axis, said rotor member being formed with at least one radial slot defined between first and second opposite walls and with first and second passages debouching into the slot at the first and second walls respectively, a paddle member mounted on the shaft and extending with clearance into said radial slot, whereby first and second gaps exist between the paddle member and said first and second walls respectively, and a means for supplying fluid under pressure to said first and second passages and for venting fluid from said gaps.

* * * * *